(12) United States Patent
Takahashi et al.

(10) Patent No.: US 8,702,040 B2
(45) Date of Patent: Apr. 22, 2014

(54) PANEL TYPE ARTIFICIAL SATELLITE AND ARTIFICIAL SATELLITE SYSTEM THEREWITH

(75) Inventors: Tadayuki Takahashi, Sagamihara (JP); Takeshi Takashima, Sagamihara (JP); Hiroyuki Ogawa, Sagamihara (JP); Shin-ichiro Sakai, Sagamihara (JP); Naoko Iwata, Sagamihara (JP); Yoshikatsu Kuroda, Minato-ku (JP); Kazunori Masukawa, Minato-ku (JP)

(73) Assignees: Japan Aerospace Exploration Agency, Tokyo (JP); Mitsubishi Heavy Industries, Ltd., Tokyo (JP)

( * ) Notice: Subject to any disclaimer, the term of this patent is extended or adjusted under 35 U.S.C. 154(b) by 217 days.

(21) Appl. No.: 13/096,078

(22) Filed: Apr. 28, 2011

(65) Prior Publication Data

US 2011/0278399 A1    Nov. 17, 2011

(30) Foreign Application Priority Data

May 14, 2010    (JP) ................................ 2010-111607

(51) Int. Cl.
   *B64G 1/00*     (2006.01)
(52) U.S. Cl.
   USPC ..................................... 244/158.1; 244/137.1
(58) Field of Classification Search
   USPC .................................. 244/158.1, 173.1, 159.4
   See application file for complete search history.

(56) References Cited

U.S. PATENT DOCUMENTS

| | | | |
|---|---|---|---|
| 4,880,050 A | 11/1989 | Nakamura et al. | |
| 5,086,999 A * | 2/1992 | Mullen | 244/159.4 |
| 5,152,482 A | 10/1992 | Perkins et al. | |
| 5,372,340 A | 12/1994 | Ihara et al. | |
| 6,626,231 B2 | 9/2003 | Cluzet et al. | |
| 7,478,782 B2 * | 1/2009 | Huang et al. | 244/158.1 |

(Continued)

FOREIGN PATENT DOCUMENTS

| | | |
|---|---|---|
| JP | 61-268599 | 11/1986 |
| JP | 2-48299 | 2/1990 |

(Continued)

OTHER PUBLICATIONS

Russian Office Action issued Aug. 2, 2012 in corresponding Russian Patent Application No. 2011119122/11 (028242) with English translation.

(Continued)

*Primary Examiner* — Philip J Bonzell
(74) *Attorney, Agent, or Firm* — Wenderoth, Lind & Ponack, L.L.P.

(57) ABSTRACT

An artificial satellite system includes at least two panel type artificial satellites closely connected with a plurality kind of multi networks and the minimum necessary essential tools for one artificial satellite installed on a substrate of each panel type artificial satellite, wherein the multi networks are formed by a communicating network for communicating data among data processing tools installed on each of the panel type artificial satellites, a heat pipe for providing thermal energy among tools installed on each of the panel type artificial satellites and a battery supplying line for connecting battery controlling devices installed in the each panel type artificial satellite so that the artificial satellite system can maintain higher and various controlling performance with a back-up effect of the multi network in the case that any function tool is damaged in one of the panel type artificial satellite.

9 Claims, 5 Drawing Sheets

(56) References Cited

U.S. PATENT DOCUMENTS

| | | | |
|---|---|---|---|
| 7,967,256 B2* | 6/2011 | Wong | 244/171.8 |
| 8,146,867 B2* | 4/2012 | Jordan et al. | 244/159.4 |
| 2006/0016935 A1* | 1/2006 | Jordan et al. | 244/159.4 |
| 2006/0105706 A1 | 5/2006 | Huang et al. | |
| 2007/0040702 A1 | 2/2007 | Mosher et al. | |
| 2008/0277532 A1* | 11/2008 | Wong | 244/171.8 |

FOREIGN PATENT DOCUMENTS

| JP | 5-193592 | 8/1993 |
|---|---|---|
| JP | 10-203500 | 8/1998 |
| JP | 10-210057 | 8/1998 |
| JP | 10-287298 | 10/1998 |
| JP | 2000-302100 | 10/2000 |
| JP | 2001-253400 | 9/2001 |
| JP | 2004-168285 | 6/2004 |

OTHER PUBLICATIONS

Japanese Notice of the Rejection issued Jan. 7, 2014 in corresponding Japanese Patent Application No. JP 2010-111607 with English translation.

* cited by examiner

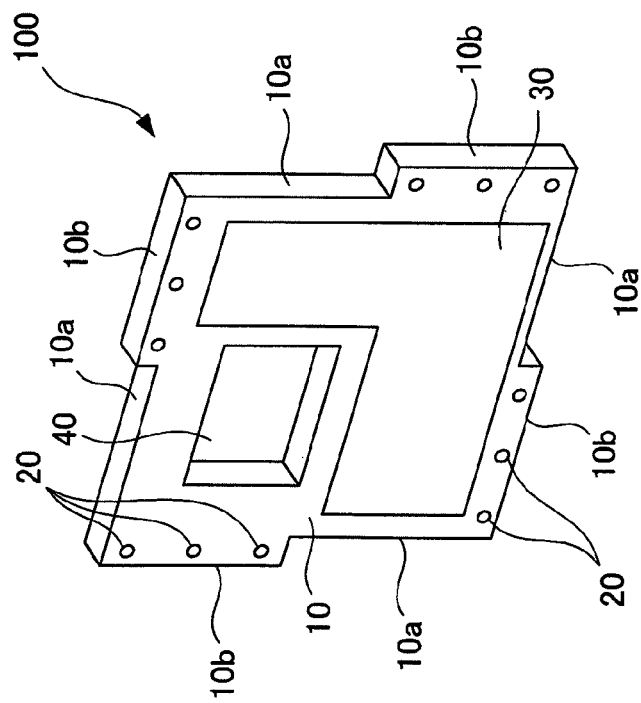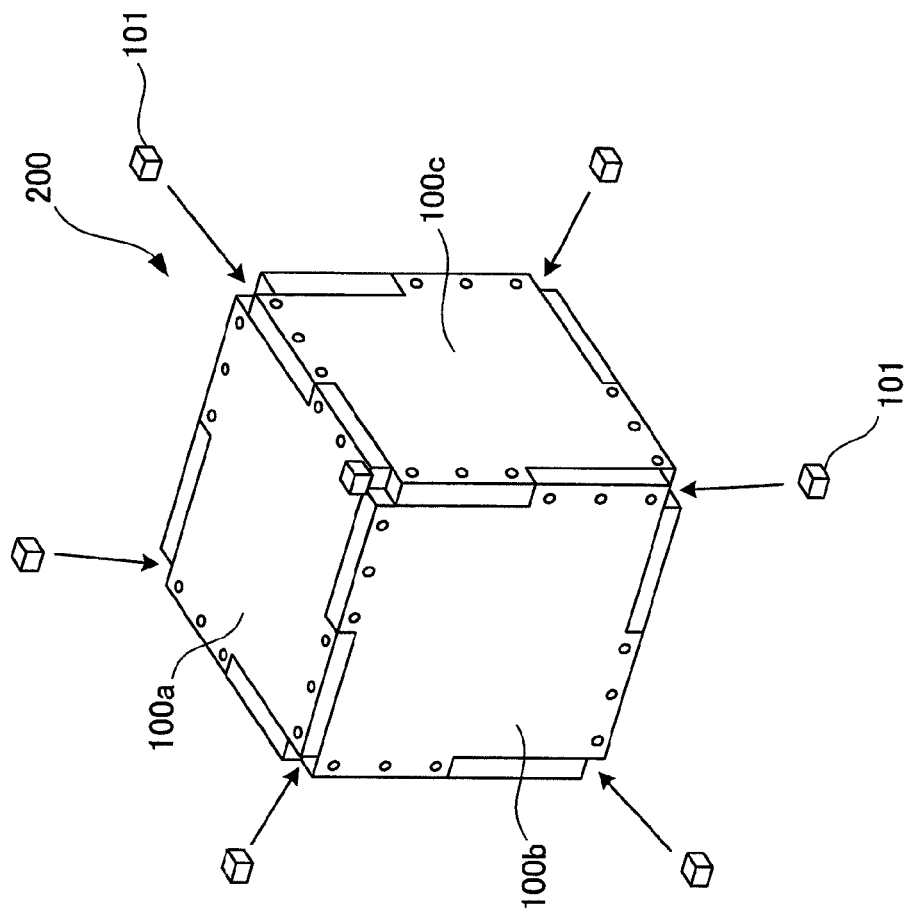

PANEL TYPE ARTIFICIAL SATELLITE AND ARTIFICIAL SATELLITE SYSTEM THEREWITH

BACKGROUND OF THE INVENTION

I. Technical Field

The invention relates to a panel type artificial satellite and an artificial satellite system with panel type artificial satellites. Particularly, the invention relates to an artificial satellite system with panel type artificial satellites wherein the minimum necessary essential devices are provided in each of the panel type artificial satellite and mutually connected in a multi-network.

II. Description of the Related Art

In the conventional art, as shown in FIG. 2, a cube-shaped micro small type artificial satellite has been recommended. In such a conventional artificial satellite 1, each panel 1a, 1b, 1c, etc. has different functions, respectively and a different device 2 (3, 4 and etc.) is provided at the respective panel 1a (1b, 1c and etc). However, each panel 1a, 1b, 1c and etc. is not mutually connected in a network system.

The device 2 (3, 4, etc.) provided at the each panel 1a (1b, 1c, etc.) is electrically connected in serial communication or parallel communication with a one-to-one network. The devices are not connected in a network communication as one artificial satellite system so that "Plug and Play" operation can not be accomplished as one electric communication system.

In view of a point of a thermal control, a heat pipe is connected with the one-to-one network so that such a thermal connection cannot be accomplished to form a network. In a conventional thermal control in an artificial satellite, thermal connections are very complicated and cannot be standardized.

Japanese Patent Laid-Open Publication No. 2-48299 discloses a conventional electric control method in an artificial satellite.

SUMMARY OF THE INVENTION

In view of the above drawbacks in the conventional art, a purpose of the invention is to provide a panel type artificial satellite that has a high performance and is manufactured with a low production cost and developed quickly for broad utilities and to provide an artificial satellite system with the panel type artificial satellites.

In order to resolve the above drawbacks, one embodiment includes a panel type artificial satellite in which the minimum necessary essential tools for an artificial satellite are installed is wherein at least two panel type artificial satellites can be connected each other.

In order to resolve the above drawbacks, one embodiment includes an artificial satellite system comprising at least two panel type artificial satellites as discussed above, wherein the panel type artificial satellites are closely connected in a multi network.

In order to resolve the above drawbacks, one embodiment includes artificial satellite system wherein the multi network in the artificial satellite system as discussed above is a communicating network for communicating data among data processing devices that are installed in all the panel type artificial satellites, respectively.

In order to resolve the above drawbacks, one embodiment includes artificial satellite system as discussed above wherein the multi network is a heat pipe for providing thermal energy among tools that are installed in all the panel type artificial satellites, respectively.

In order to resolve the above drawbacks, one embodiment includes an artificial satellite system as discussed above wherein the multi network is a battery supplying line for connecting among battery control tools installed in all the panel artificial satellites, respectively.

In order to resolve the above drawbacks, one embodiment includes an artificial satellite system as discussed above at least two panel type artificial satellites connected each other wherein each of the panel type artificial satellite includes the minimum necessary essential tools mounted on a substrate and the necessary essential tools are closely connected with a plurality of kinds of multi networks, wherein the multi networks are formed by a communicating network for communicating data among data processing tools installed in the respective panel type artificial satellites, a heat pipe for providing thermal energy among tools installed in the respective panel type artificial satellites, and a battery supplying line for connecting among battery control tools installed in the respective panel type artificial satellites.

One embodiment includes a panel type artificial satellite as discussed above that installs the minimum necessary essential tools for an artificial satellite and at least two panel type artificial satellites can be connected to each other so that the artificial satellite has high performances and can be developed for a short duration with a low manufacturing cost and utilized for broader purposes.

One embodiment includes an artificial satellite system as discussed above that comprises at least two panel type artificial satellites and the panel type artificial satellites are closed connected in the multi network so that the artificial satellite system with the multi network can operate more flexibly with higher performance compared with one panel type artificial satellite operating solely.

One embodiment includes an artificial satellite system as discussed above that comprises the multi network set forth above wherein the communicating network communicates data among data processing devices those are installed in the all panel type artificial satellites, respectively. Even if one data processing device stalled in one panel type artificial satellite is damaged, the other data processing devices process data in stead of the damaged data processing device so as to maintain functions of the artificial satellite system.

One embodiment includes an artificial satellite system as discussed above that comprises the multi network set forth above wherein a heat pipe for providing thermal energy among tools those are installed in the all panel type artificial satellites, respectively. Even if one portion of the heat pipe is damaged, thermal energy produced from the respective tools can be dispersed or diffused through a route different from a damaged route so as to maintain functions of the artificial satellite system.

One embodiment includes an artificial satellite system as discussed above that comprises the multi network set forth above, wherein a battery supplying line connects among battery control tools those are installed in the all panel artificial satellite, respectively. Even if one battery control device installed in one panel type artificial satellite is damaged, battery control can be still continued by the other battery control tools installed in the other panel type artificial satellites through a battery supplying line so as to maintain functions of the artificial satellite system.

One embodiment includes an artificial satellite system that comprises at least two panel type artificial satellites connected each other, wherein each said panel type artificial satellites includes the minimum necessary essential tools mounted on a substrate and the necessary essential tools are closely connected with a plurality kind of multi networks and the artificial satellite system is wherein the multi networks are formed by a communicating network for communicating data among data processing tools those are installed in the respective panel type artificial satellites, respectively, a heat pipe for providing thermal energy to tools those are installed in the respective panel type artificial satellites, respectively and a battery supplying line for connecting among electric control tools installed in the respective panel type artificial satellites, respectively, so that the artificial satellite system with the multi networks can operate more flexibly with higher performance compared with one panel type artificial satellite operating solely. Even if one portion of at least two panel type artificial satellites is damaged, functions of the artificial satellite system can be maintained with the multi networks such as the communicating network, the heat pipe and the battery supplying line.

BRIEF DESCRIPTION OF DRAWINGS

FIG. 1(a) shows a perspective view of a panel type artificial satellite according to the present invention.

FIG. 1(b) shows a perspective view of an artificial satellite system according to the present invention.

DETAILED DESCRIPTION OF THE INVENTION

Figure 2:
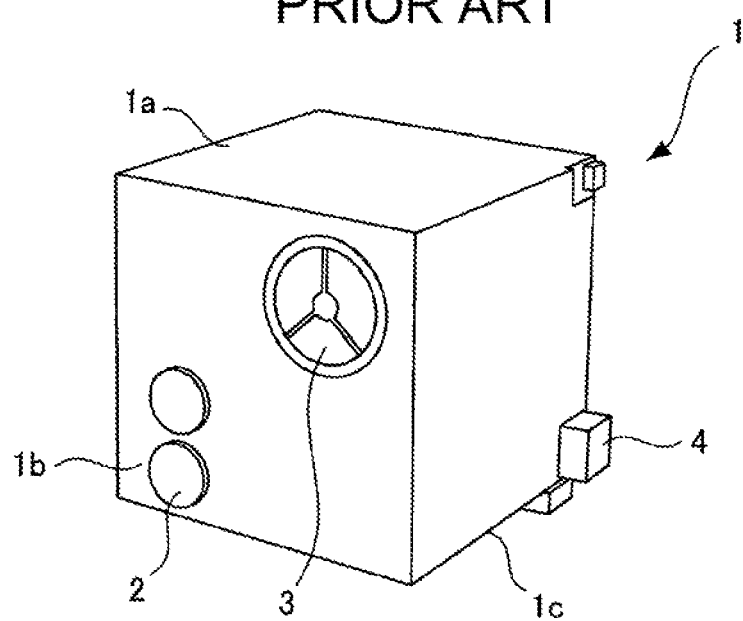
FIG. 2 shows a perspective view of a conventional micro small artificial satellite.

The embodiment of the present invention is shown in FIG. 1(a) and FIG. 1(b). The panel type artificial satellite 100 as shown in FIG. 1 has a square shaped substrate 10 on which minimum necessary essential tools are mounted and a function for connecting at least two panel type artificial satellites (hereinafter, such a connection per a standard panel type artificial satellite is called as "core block").

A pair of a concave portion 10a and a convex portion 10b is provided at each edge of the square shaped substrate 10. At the convex portion 10b, three mechanical coupling portions 20 are provided. Accordingly, each panel type artificial satellite 100 has a structure for coupling with each other by engaging a concave portion of one panel type artificial satellite 100 and a convex portion of a different panel type artificial satellite 100.

At a part of an outer surface of the substrate 10, for example, a window portion 40 provided for installing a mission commanded tool such as an infrared ray camera and so on. As the minimum necessary essential tools in the artificial satellite, for example, a solar battery panel, a thermal controller, a communication tool, a mission commanded tool, such as an optical camera and so on, a micro small high performance data processing device, an artificial satellite bath function tool and so on are considerable.

At the other portion of the outer surface of the substrate 10 except the window portion 40 as described above, a solar battery panel 30 and the minimum necessary essential tools, for instance, a data processing tool, a battery tool, a communicating tool and a thermal controlling tool and so on are provided. The described panel type artificial satellite 100 can be usually utilized independently since each panel type artificial satellite 100 has minimum necessary essential function so as to control an artificial satellite. If at least two panel type artificial satellites 100 are coupled, the coupled panel type artificial satellites 100 can control various functions with high performance for broad purposes.

For example, an artificial satellite system as shown in FIG. 1(b) is a cube shaped artificial satellite system 200 coupled by six panel type artificial satellites 100 as shown in FIG. 1(a) (hereinafter, such a cube type artificial satellite system is referred as "six core blocks"). That is, the artificial satellite system 200 is formed as a cube shape by arranging six panel artificial satellites 100a, 110b, 100c, . . . and 100f with respect to each respective surface of the cube shape wherein the concave portion 10a of one substrate 10 and the convex portion 10b of the other substrate 10 are mutually and mechanically coupled. At an each corner portion of the cube shaped artificial satellite system 200, a corner cube 101 having an antenna function is arranged.

Each panel type artificial satellite 100a, 100b, 100c, . . . and 100f has an individual different function tool in addition to minimum common necessary essential function tools, respectively. For example, an observation tool such as an infrared ray camera, an X-ray camera, an ultraviolet ray camera, a gummer ray sensor, a magnetic field sensor and a visible ray camera is installed at the window portion 40 provided for a mission commanded tool. All the panel type artificial satellites 100a, 100b, 100c, . . . and 100f are closely connected in a multi network relation (not shown). Upon comparing with a case that one artificial satellite is utilized solely, the plurality of artificial satellites formed with the multi network can be utilized broadly for purposes with higher performance.

In the present invention, a multi network (Plug status) is arranged by coupling the respective substrates 10 without any special setting operation. The tools installed in the respective panel type artificial satellites 100a, 100b, 100c . . . and 100f can be recognized by each other in the multi network and mutually operated/relates (Play status). Thus, "Plug and Play" status can be accomplished. Accordingly, it is unnecessary to couple the respective panel type artificial satellites 100a, 100b, 100c . . . previously on the earth. In order to utilize the plurality of the panel type artificial satellites with the multi network, the panel type artificial satellites 100a, 100b, 100c, . . . can be simply coupled in space.

The multi network according to the present invention means various different definitions and includes not only an electrical multi network among the each panel type artificial satellite 100a, 100b, 100c, . . . but also a thermal control multi network relation, and a battery multi network. The multi network will be described in detail hereinafter.

Embodiment 1

Figure 3:
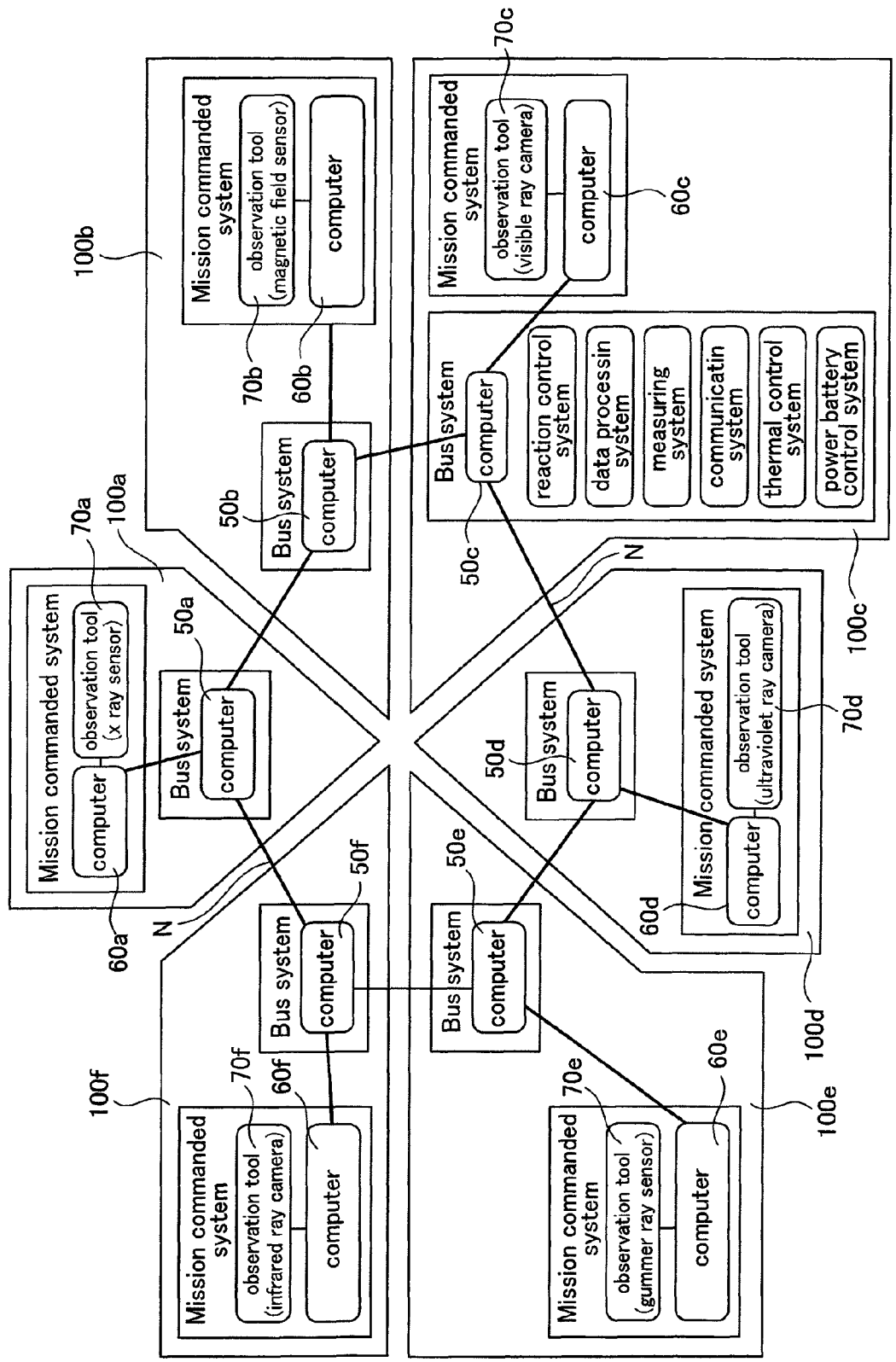
FIG. 3 shows an outline of a first embodiment of a cube-type artificial satellite according to the present invention, wherein the cube-type artificial satellite is two-dimensionally developed.

FIG. 3 shows the first embodiment of the present invention. FIG. 3 shows an outline view of a cube shape artificial satellite system that is two-dimensionally developed and called as the six core blocks. The six core blocks, that is, the artificial satellite system according to the present invention, are formed by combining six core blocks, the panel type artificial satellites 100a, 100b, 100c, 100d, 100e and 100f. Each panel type artificial satellite 100a (100b to 1000 comprises a bus system computer 50a (50b to 50f) as a data processing device and a computer 60a (60b to 60f) as a mission commanded tool.

With respect to a corresponding artificial satellite, the bus system computer 50a (50b to 50f) operates fundamental controls, such as reaction control, data processing control, a measuring control, communicating control, thermal control and battery control. The mission commanded computers 60a to 60f control measuring tools such as an x-ray sensor 70a, a magnetic field sensor 70b, a visible ray camera 70c, an ultraviolet ray camera 7d, a gummer ray sensor 70e and an infrared ray camera 70f, respectively.

The bus system computers 50a to 50f and the mission commanded computers 60a to 60f are mutually connected with communicating lines and the bus system computers 50a to 50f are closed communicated therebetween with the multi network. The multi network relation N according to the first embodiment is a communicating network in which the computers 50a to 50f are connected in a loop style. Thus, one computer is connected to at least two adjacent computers.

Herein, the multi network N means mutual connections except a one-to-one connection. In a loop style, one computer is connected to the two adjacent computers as shown in the drawing. In addition, a star style in which computers are connected in multi radial directions and an internet style in which the computers are connected each other in a net-like formation are considered. As a multi network N for an artificial satellite according to the present invention, for example, a "Space Wire" that might become a global standard in a data communication specification in future is considered.

As described above, in the first embodiment of the present invention, the bus system computers 50a to 50f are connected in the loop style as the multi network N. Therefore, even if any accident/failure occurs at one of the bus system computers 50a to 50f, the other computers 50a to 50f can support a back-up operation instead of one damaged computer. For example, if the bus system computer 50c utilized for reaction control is damaged, one of the adjacent computers 50b and 50d can operate the reaction control through the multi network N instead of the damaged bus system computer 50c. Although one bus system computer 50a (50b to 50f) is installed in each panel type artificial satellite 100a (100b to 100f), it is possible to install a plurality of bus system computers for operating various controls in parallel so as to process an operation quickly.

Embodiment 2

Figure 4:
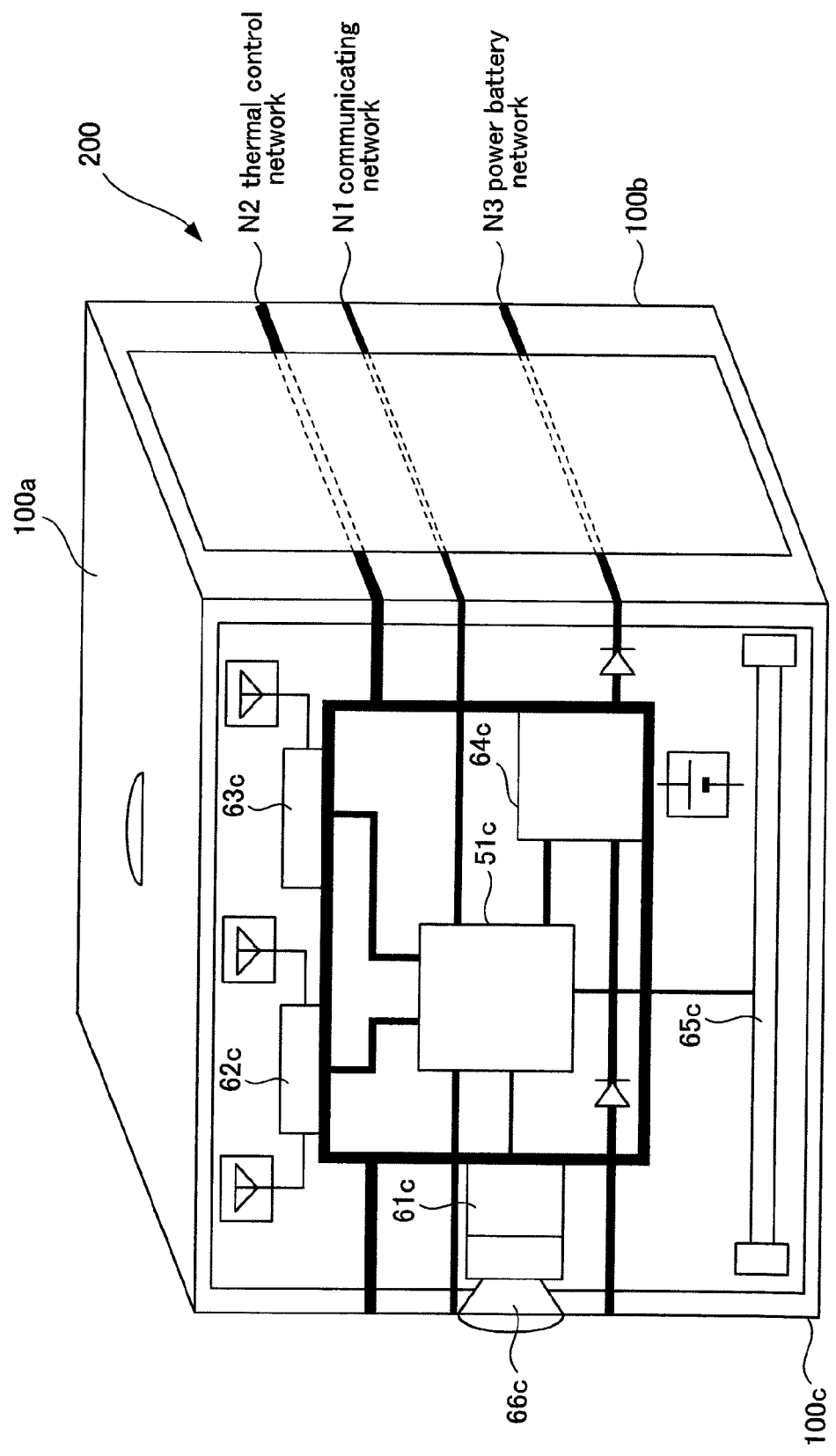
FIG. 4 shows a perspective view of a second embodiment of a cube-type artificial satellite system according to the present invention.

FIG. 4 shows the second embodiment of the present invention. FIG. 4 is a perspective view of six core blocks corresponding to an artificial satellite system according to the present invention. A cube shaped artificial satellite system according to the present invention 200 is formed by coupling six panel type satellites 100a, 100b, 100c, 100d, 100e and 100f. The cube shaped artificial satellite system 200 is closely connected with a plurality of kinds of multi networks, that is, a communicating network N1, a thermal controlling network N2 and a battery network N3.

The computer 51c installed as a data processing device in the panel type artificial satellite 100c is connected to the other data processing devices installed in the respective panel type artificial satellites in a loop shape with the communicating network N1. The computer 51c installed in the panel type artificial satellite 100c is connected to the computer 61c as an observation tool 66c such as a camera, a communicating tool 62c, a GPS receiver 63c, a battery control device 64c and a reaction style controlling device 65c through communication lines.

Further, the thermal controlling network N2 is connected to all panel type artificial satellites 100a to 100f in a loop style and also connected to the computer 61c, a communicating tool 62c, a GPS receiver 63c and a battery control device 64 installed in the panel type artificial satellite 100c in a loop style.

In the second embodiment, the thermal control network N2 employs a "Heat Pipe" generally known as a thermal control device. Further, an advanced thermal control device so call as a "Loop Heat Pipe" is employed as the thermal control network N2. In the "Loop Heat Pipe", thermal energy is transported by utilizing steam latent heat of a sealed coolant.

In the second embodiment, thermal energy produced from each tool installed in the panel type artificial satellites 100a to 100f is effectively dispersed or diffused through the thermal control network N2 connected in a loop style.

Even if one portion is damaged in the thermal control network N2 connected in the loop style, thermal energy is dispersed or diffused through a different portion in the thermal control network N2. Thus, the thermal control can be maintained in the artificial satellite system.

The battery network N3 is also a multi network wherein each battery control device 64c installed in the respective panel type artificial satellites 100a to 100f is connected to each other in the loop style. Thus, even if one of the battery control devices 64 installed in one of the panel type artificial satellites 100a to 100f is damaged, the other battery control devices 64 can support an operation of such a damaged battery control device 64c in the battery network N3. Therefore, the artificial satellite system can maintain its functions without any trouble.

Except a portion of the outer surface of the substrate 10 of the panel type artificial satellite 100a to 100f on which an observation tool 66c is provided, a solar battery panel is mounted on the outer surface of the substrate 10 of the panel type artificial satellite 100a to 100c. As shown in the panel type artificial satellite 100c in FIG. 4, the other tools are provided at an inside surface of the substrate 10 of the panel type artificial satellite 100c.

Embodiment 3

Figure 5:
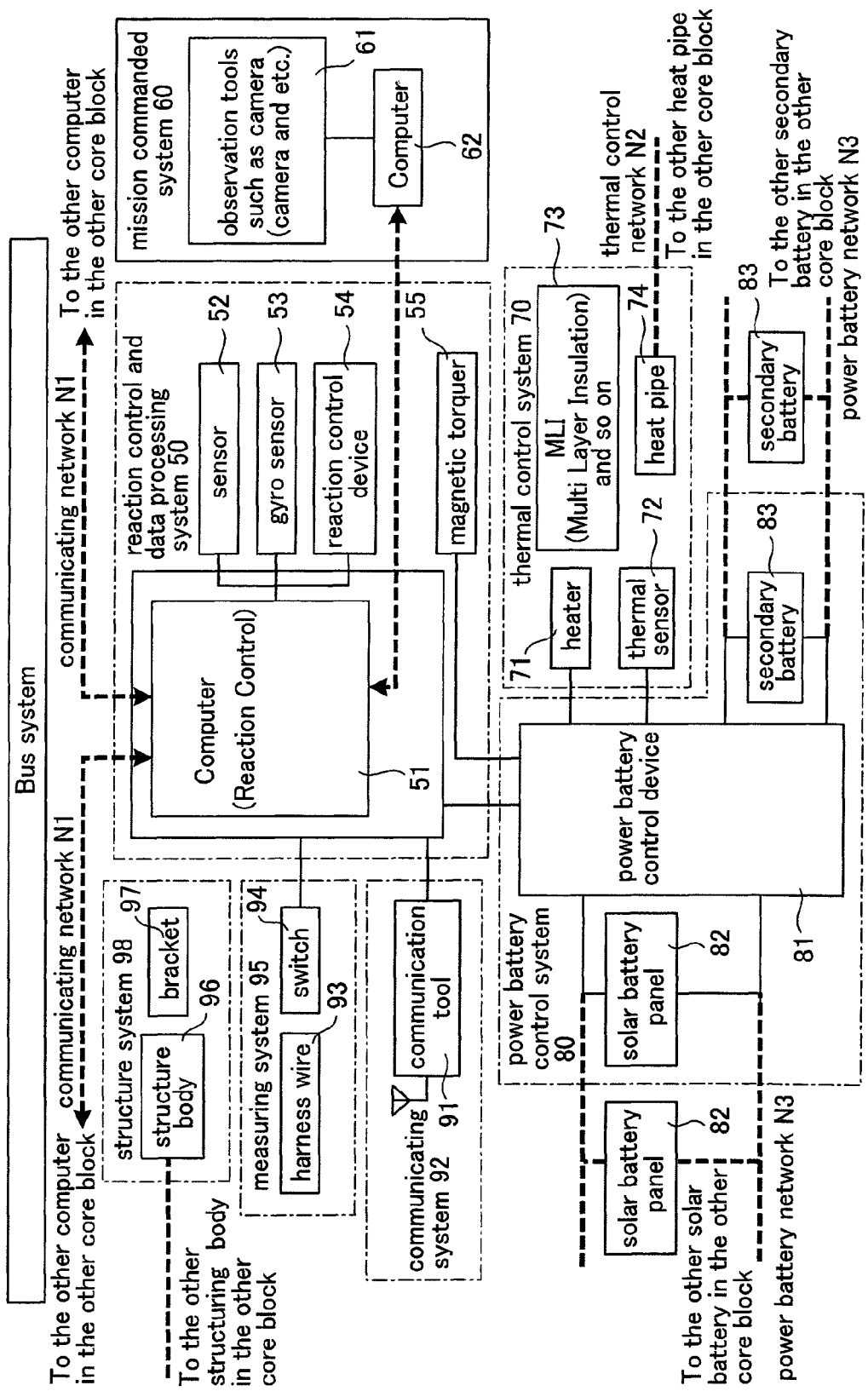
FIG. 5 shows a block diagram of a third embodiment of a panel type artificial satellite according to the present invention, wherein each functions is explained with respect to the corresponding the panel type artificial satellite, respectively.

FIG. 5 is the third embodiment according to the present invention. FIG. 5 is a block diagram for explaining each functions in a panel type artificial satellite. In the third embodiment, the panel type artificial satellite 100 comprises a reaction control and data processing system 50, a mission commanded system 60, thermal control system and a battery control system 80.

The reaction control and data processing system 50 comprises a reaction control computer 51, an individual sensor 52, a gyro sensor 53, a reaction control device 54, a magnetic torquer 55 and so on. The reaction control computer 51 is closely connected to a computer installed in the other core block corresponding to the other panel type artificial satellite through the communication network N1 (bus system) as the multi network. The mission commanded system 60 is formed by an observation tool 61 such as a camera, a computer 62 for controlling the observation tool 61. The computer 62 is connected to the reaction control computer 51 through the communication line.

The thermal control system 70 is formed by a heater 71, a thermal sensor 72, MLA 73, the Heat-Pipe 74 and so on. The Heat-Pipe 74 is connected to a Heat-pipe of the other core block corresponding to the other panel type artificial satellite through the thermal control network N2. The thermal control network N2 is the multi network. The battery control system 80 is formed by a battery control device 81, a solar battery panel 82 and a secondary battery 83. The battery control device 81 is connected to the solar battery panel 82 and the secondary battery 83 and further connected to a heater 71 and a thermal sensor 72.

The solar battery panel 82 is also connected to the other solar battery panel mounted on the other core block equivalent of the other panel type artificial satellite through the battery network N3. The secondary battery 83 is connected to the other secondary battery installed in the other core block equivalent of the other panel type artificial satellite through the battery network N3. The battery network N3 is the multi network.

The panel type artificial satellite 100 further comprises a communicating system 92 including a communicator 81, a measuring system 95 including a harness wire 93 and a switching device 94 and so on and a structuring system 98 including a body 96 and a bracket 97. The body 96 is connected to the other bodies of the other core blocks equivalent of the other panel type block artificial satellites. In the third embodiment, even if any function meets with any trouble in the reaction control and data processing system 50, the thermal control system 70 or the battery control system 80, such a failure of the function happened in one core block can be recovered by the other tool/device having the same function in the other core block equivalent of the panel type artificial satellite through the communicating system N1, the thermal control network N2 and the battery network N3 so that the reaction control, the thermal control and the battery control in one artificial satellite can be maintained.

Although a cube shaped artificial satellite system according to the present invention is described in the above embodiments, the artificial satellite system according to the present invention may include at least two panel type artificial satellites connected to each other. The plurality of artificial satellites are arranged in a liner shape or a plate shape. Although a square shaped panel type satellite is described as the embodiment of the present invention, a panel type artificial satellite according to the present invention may have a rectangular shape. In addition, a panel type artificial satellite according to the present invention may have a triangle shape. It is possible to provide an octahedron shape artificial satellite system formed by eight triangle shaped panel type artificial satellites.

The present invention relates to a panel type artificial satellite in which minimum necessary essential tools are installed and an artificial satellite system formed by a plurality of panel type artificial satellites those are closed connected with a plurality kind of multi networks. The present invention can be broadly utilized in a space industry.

The invention claimed is:

1. A panel type artificial satellite system, comprising:
    at least two panel type artificial satellites configured to be connected to each other; and
    tools for the at least two panel type artificial satellites installed in the at least two panel type artificial satellites,
    wherein the at least two panel type artificial satellites are connected in a multi network, the multi network being at least one of a communicating network configured to communicate data among data processing devices, a heat pipe configured to provide thermal energy among thermal energy tools, and a battery supplying line connected among battery control tools,
    wherein the at least two panel type artificial satellites include at least one of the data processing devices, the thermal energy tools and the battery control tools, and
    wherein if the at least one of the data processing device, the thermal energy tool and the battery control tool in one of the at least two panel type artificial satellites experiences a failure, the corresponding at least one of the data processing device, the thermal energy tool and the battery control tool in another of the at least two panel type artificial satellites compensates for the failure.

2. An artificial satellite system as claimed in claim 1, wherein the multi network includes the battery supplying line, and each of the at least two panel artificial satellites includes a battery control tool of the battery control tools among which the battery supplying line is connected.

3. An artificial satellite system as claimed in claim 1, wherein the multi network includes the communicating network, and each of the at least two panel type artificial satellites includes a data processing device of the data processing devices among which the communicating network is configured to communicate data.

4. An artificial satellite system as claimed in claim 3, wherein the multi network includes the battery supplying line, and each of the at least two panel artificial satellites includes a battery control tool of the battery control tools among which the battery supplying line is connected.

5. An artificial satellite system as claimed in claim 3, wherein the multi network includes the heat pipe, and each of the at least two panel type artificial satellites includes a thermal energy tool of the thermal energy tools among which the heat pipe is configured to provide thermal energy.

6. An artificial satellite system as claimed in claim 5, wherein the multi network includes the battery supplying line, and each of the at least two panel artificial satellites includes a battery control tool of the battery control tools among which the battery supplying line is connected.

7. An artificial satellite system as claimed in claim 1, wherein the multi network includes the heat pipe, and each of the at least two panel type artificial satellites includes a thermal energy tool of the thermal energy tools among which the heat pipe is configured to provide thermal energy.

8. An artificial satellite system as claimed in claim 7, wherein the multi network includes the battery supplying line, and each of the at least two panel artificial satellites includes a battery control tool of the battery control tools among which the battery supplying line is connected.

9. An artificial satellite system, comprising:
    at least two panel type artificial satellites connected to each other, each of the panel type artificial satellites includes tools mounted on a substrate and the tools are connected with a plurality of multi networks,
    wherein the multi networks include a communicating network configured to communicate data among data processing devices, a heat pipe configured to provide thermal energy among thermal energy tools, and a battery supplying line connected among battery control tools,
    wherein each of the at least two panel artificial satellites includes a data process device of the data processing devices, a thermal energy tool of the thermal energy tools, and a battery control tool of the battery control tools, and
    wherein if any of the data processing device, the thermal energy tool and the battery control tool in one of the at least two panel type artificial satellites experiences a failure, the corresponding one of the data processing device, the thermal energy tool and the battery control tool in another of the at least two panel type artificial satellites compensates for the failure.

* * * * *